US 6,637,709 B1

(12) United States Patent
Guenther et al.

(10) Patent No.: US 6,637,709 B1
(45) Date of Patent: Oct. 28, 2003

(54) SELF-ADJUSTABLE CUP HOLDERS

(75) Inventors: Walter P. Guenther, Springboro, OH (US); Joshua Williams, Tipp City, OH (US); Edward J. Zotter, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/244,635

(22) Filed: Sep. 16, 2002

(51) Int. Cl.[7] .................................................. A47K 1/08
(52) U.S. Cl. ..................... 248/311.2; 224/282; 224/926; 297/188.14
(58) Field of Search ............................. 248/311.2, 314; 224/282, 926; 297/188.14, 188.19

(56) References Cited

U.S. PATENT DOCUMENTS

| | | |
|---|---|---|
| 1,483,592 A | 2/1924 | Pelstring |
| 2,107,845 A | 2/1938 | Albert ........................ 206/19.5 |
| 3,814,359 A | 6/1974 | Powell ......................... 248/99 |
| 4,583,707 A | 4/1986 | Anderson ..................... 248/293 |
| 5,060,899 A * | 10/1991 | Lorence et al. ........... 248/311.2 |
| 5,141,194 A | 8/1992 | Burgess et al. ........... 248/311.2 |
| 5,154,380 A | 10/1992 | Risca .......................... 248/154 |
| 5,297,767 A * | 3/1994 | Miller et al. .............. 248/311.2 |
| 5,398,898 A * | 3/1995 | Bever .......................... 248/154 |
| 5,560,578 A * | 10/1996 | Schenken et al. ........... 248/313 |
| 5,603,477 A | 2/1997 | Deutsch .................... 248/311.2 |
| 5,618,018 A | 4/1997 | Baniak .................... 248/311.2 |
| 5,634,621 A | 6/1997 | Jankovic ................... 248/311.2 |
| 5,671,877 A | 9/1997 | Yabuya ........................ 224/282 |
| 5,823,410 A | 10/1998 | Ackeret ........................ 224/281 |
| 5,845,888 A | 12/1998 | Anderson ................ 248/311.2 |
| 5,865,411 A | 2/1999 | Droste et al. ............ 248/311.2 |
| 5,899,426 A | 5/1999 | Gross et al. ............. 248/311.2 |
| 5,912,832 A | 6/1999 | Baird, Sr. .................... 362/551 |
| 5,988,579 A | 11/1999 | Moner, Jr. et al. ........ 248/311.2 |
| 5,997,082 A | 12/1999 | Vincent et al. ......... 297/188.19 |
| 6,047,937 A | 4/2000 | Huang ..................... 248/311.2 |
| 6,070,844 A | 6/2000 | Salenbauch et al. ......... 248/313 |
| 6,193,399 B1 | 2/2001 | Hulse ......................... 362/511 |
| 6,217,483 B1 | 4/2001 | Kallassy ...................... 482/38 |
| 6,234,439 B1 | 5/2001 | Townsend et al. ....... 248/311.2 |

FOREIGN PATENT DOCUMENTS

EP      0 845 386      6/1999

* cited by examiner

Primary Examiner—Ramon O. Ramirez
(74) Attorney, Agent, or Firm—Scott A. McBain

(57) ABSTRACT

A self-adjusting cup holder is provided. The cup holder includes a receiving area, compensating levers, and biasing members for biasing the compensating levers to a first position. The receiving area is configured to receive a portion of a drinking vessel. The compensating levers are disposed in slots defined in the wall of the receiving area. A first end of the compensating levers is pivotally connected to a portion of the wall such that a first edge of the levers is movable between the first position and a second position. The first edge is within the receiving area when the levers are in the first position. The first edge is farther from the sidewall in the first position than in the second position.

26 Claims, 4 Drawing Sheets

SELF-ADJUSTABLE CUP HOLDERS

FIELD OF THE INVENTION

This disclosure relates generally to cup holders. More specifically, this disclosure relates to self-adjustable cup holders.

BACKGROUND

Cup holders find use in a variety of everyday places. For example, most vehicles include a cup holder as a standard feature. These cup holders typically comprise an open chamber configured to receive a bottom portion of a cup or drinking vessel. It is desirable to have a cup holder that is capable of firmly grasping drinking vessels of more than one size.

SUMMARY

A self-adjusting cup holder is provided. The cup holder comprises a receiving area, compensating levers, and biasing members for biasing the compensating levers to a first position. The receiving area is configured to receive a portion of a drinking vessel. The compensating levers are disposed in slots defined in the wall of the receiving area. A first end of the compensating levers is pivotally connected to a portion of the wall such that a first edge of the levers is movable between the first position and a second position. The first edge is within the receiving area when the levers are in the first position. The first edge is farther from the sidewall in the first position than in the second position.

A method of retaining a drinking vessel is also provided. The method comprises inserting a portion of the drinking vessel through an opening into a receiving area; and contacting the portion of the drinking vessel with a plurality of compensating levers disposed in the receiving area such that the plurality of compensating levers overcome a biasing means to move from a first position to a second position, the biasing means urging the plurality of compensating levers towards the first position such that the portion of the drinking vessel is retained in the receiving area.

The above-described and other features of the present disclosure will be appreciated and understood by those skilled in the art from the following detailed description, drawings, and appended claims.

DESCRIPTION OF THE PREFERRED EMBODIMENT

Figure 1:
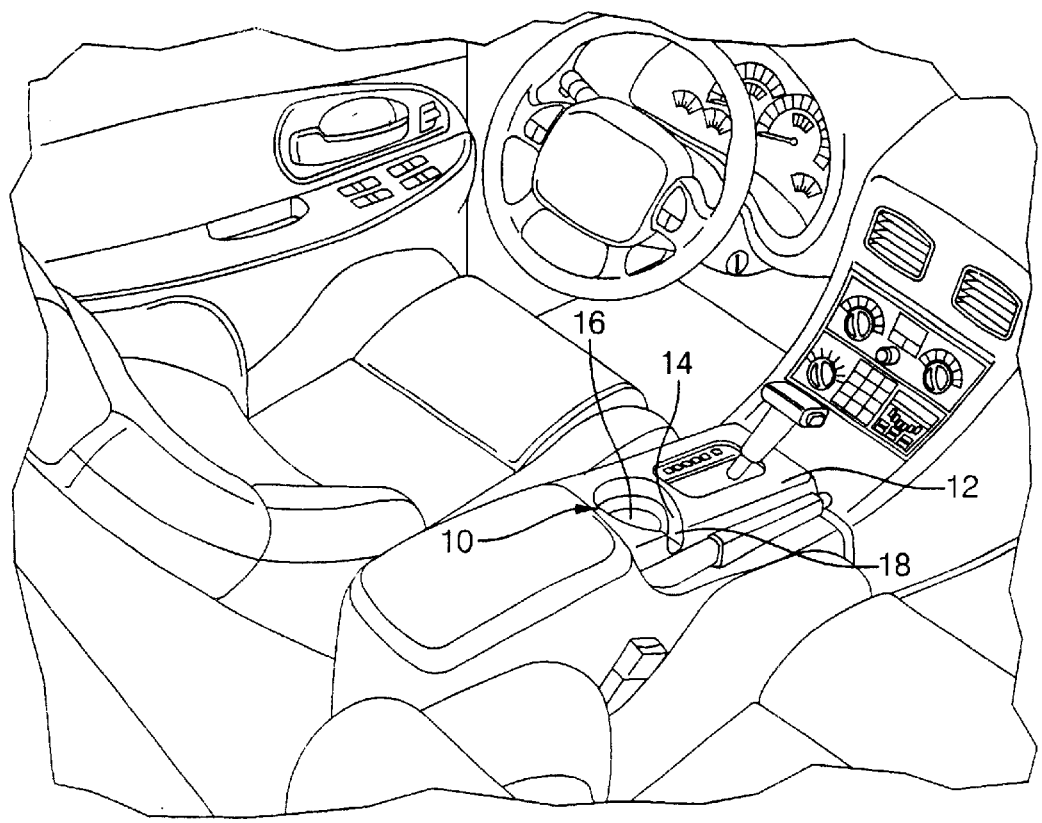
FIG. 1 is a perspective view of a vehicle interior.
Figure 2:
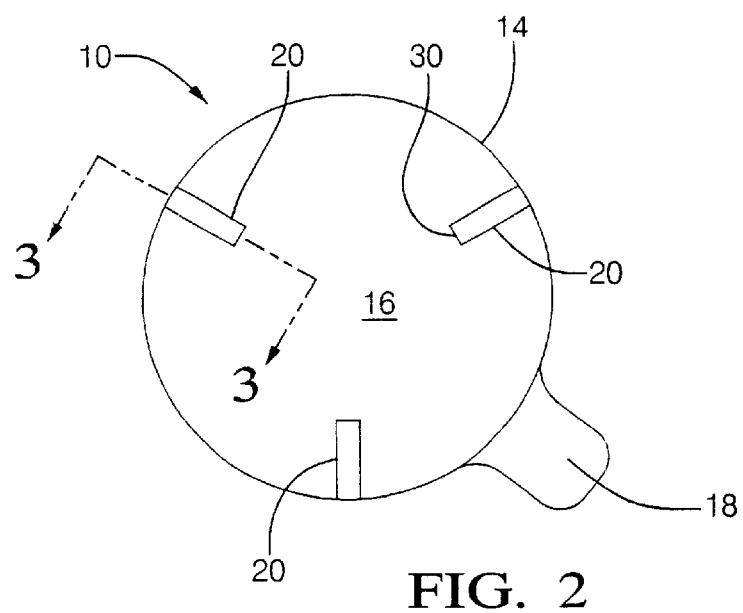
FIG. 2 is a top view of an exemplary embodiment of a cup holder.
Figure 3:
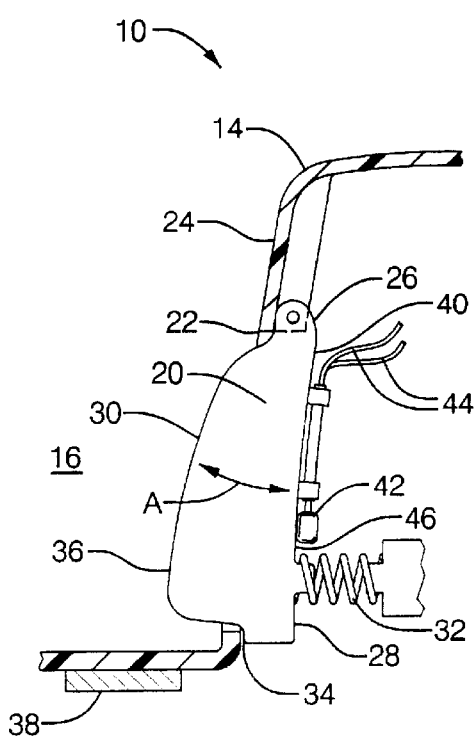
FIG. 3 is a cross sectional view of a first exemplary embodiment the cup holder of FIG. 2 along lines 3—3 in a first position.

Referring now to the figures, and in particular to FIGS. 1–4 an exemplary embodiment of a cup holder 10 is illustrated conveniently disposed within a vehicle interior. Cup holder 10 is illustrated by way of example incorporated into a center console 12 of the vehicle interior. Of course, it is contemplated for the cup holder 10 to be incorporated into other areas of the vehicle interior, such as but not limited to, a door panel, a dashboard, a seat back, and other areas. It should be recognized that cup holder 10 is illustrated by way of example only a being incorporated into a car. Of course, the cup holder of the present disclosure can find use in other vehicles, as well as non-vehicular applications, such as but not limited to, cars, trucks, buses, boats, planes, and others.

Cup holder 10 comprises an opening 14 defining in a receiving area 16 within the console 12. The opening 14 and receiving area 16 are dimensioned to receive a bottom portion of a drinking vessel 15. For example, the opening 14 and receiving area 16 are dimensioned to receive a soda can, a beverage mug, a fountain drink, and others. Advantageously, the cup holder 10 further includes a handle depression 18. The handle depression 18 is configured to receive the handle of a beverage mug therein.

Since it is desired for the cup holder 10 to accommodate drinking vessels 15 of various sizes, the cup holder further comprises one or more compensating levers 20. The levers 20 are biased inwardly to automatically adjust to the size of the drinking vessel 15 that is placed into the cup holder 10. In this manner, the self-adjusting cup holder 10 can hold a variety of sizes of vessels firmly in place. Further, the cup holder 10 self-adjusts using relatively few parts and without complicated actions.

In the illustrated embodiment, the cup holder 10 includes three compensating levers 20 evenly spaced about the circumference of the receiving area 16. Of course, is contemplated for the cup holder 10 to comprise more or less than three compensating levers 20 and for the compensating levers to be unevenly spaced about the circumference of the receiving area 16. The levers can have different widths, shapes (e.g., oval, circular), and can have different compensating depths.

Each compensating lever 20 is disposed in a slot 22 defined within the sidewall 24 of the receiving area 16. A first end 26 of the lever 20 is pivotally connected to the sidewall 24 such that the second end 28 of the lever can move with respect to the sidewall. For example, the first end 26 can be hinged to the sidewall 24. The means for hinging the lever 20 to the side wall 24 can include means, such as but not limited to, a hinge pin disposed through a portion of the lever and a portion of the side wall, integral features disposed on the lever and side wall configured to receive one another in a snap fit manner (e.g., a ball and detent), and others.

Figure 4:
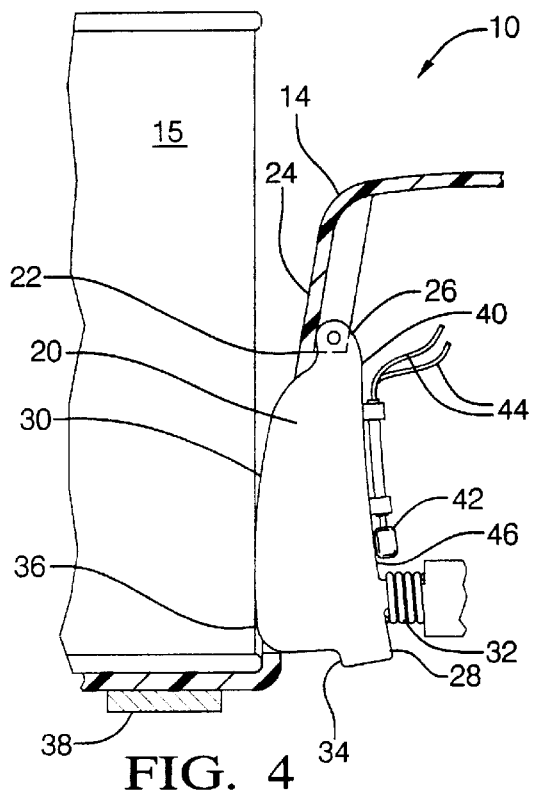
FIG. 4 is a cross sectional view of the cup holder of FIG. 3 in a second position.

The lever 20 further includes a first edge 30 positioned within the receiving area 16. Thus, the compensating lever 20 is pivotally connected to the sidewall 24 such that the first edge 30 is movable in the direction of arrow A between a first position (FIG. 3) and a second position (FIG. 4). Namely, the first edge 30 of the lever 20 is movable into and out of the receiving area 16.

Each compensating lever 20 is biased by a biasing member 32 towards the first position. The biasing member 32 can comprise a spring, an open celled foam member, or other resilient member. In the first position, a portion 34 of the compensating lever 20 abuts the slot 22 such that the lever remains positioned in the sidewall 24.

The lever 20 has a dimension (e.g., width) that is smaller than the dimension of the slot 22, thus allowing movement of the lever through the slot. However, the portion 34 has a larger dimension than the slot 22 through which the lever 20 travels, thus preventing the portion from coming out of the slot once the lever has been moved to the first position.

The first edge 30 is shaped such that the action of inserting a drinking vessel into the receiving area 16 adjusts the position of the compensating levers. The insertion of the drinking vessel overcomes the biasing member 32 to move the levers 20 from the first position. Specifically, the first edge 30 comprises an angled surface 36. As the bottom edge 17 of the drinking vessel moves down the angled surface 36 (e.g., from the first end towards the second end), the levers 20 compress the biasing members 32. In this manner, the cup holder 10 automatically or self adjusts to retain drinking vessels of various dimensions merely through the action of inserting the vessel. Once the vessel is removed from the receiving area 16, the biasing member 32 returns the levers 20 to the first position.

It can be desired to illuminate the cup holder 10 in order to make locating the receiving area 16 easier during low ambient light conditions, such as can occur during night driving. In this embodiment, it may be desired to coordinate the lighting color of the cup holder 10 to the lighting scheme of the vehicle (e.g., dash board). It can also be desired to illuminate the cup holder 10 for other reasons. For example, the cup holder 10 can incorporate a thermoelectric device 38 for heating and/or cooling the contents of the drinking vessel. In this embodiment, it may be desired to provide a visual indication as to the mode (e.g., heating or cooling) of the thermoelectric device 38. Thus, the cup holder 10 could be illuminated with a blue color scheme during cooling and with a red color scheme during heating.

In order to provide the desired illumination of the cup holder, the lever 20 is also configured to transmit light into the receiving area 16. Specifically, the lever 20 includes a second edge 40 opposite the first edge 30. One or more lighting devices 42 are operatively disposed or otherwise secured to the second edge 40. The lighting devices 42 can include incandescent light sources and light emitting diode's (LED's). Alternately, lighting devices 42 can be light transmitting devices, such as but not limited to fiber optic cables, configured to transmit light from a remote light source to second edge 40.

The lever 20 can be capable of transmitting at least a portion of the light from the lighting device 42 into the receiving area 16. Accordingly, level 20 can have transparent and/or translucent properties. Examples of materials having suitable light transmitting properties include., but are not limited to, materials made of polycarbonate, styrenics, and others. Alternately, one or more light transmitting paths (not shown) can be provided between the lighting devices 42 and receiving area 16 through the lever 20.

The light from the lighting sources 42 lever can be colored by one or more means, such as but not limited to, colored light sources, colored levers, or colored filters disposed between the light sources and the levers.

The lighting devices 42 are connected to a power source (not shown) by way of wires or leads 44. The power source can be the same source as the dashboard lights of the vehicle, or can be the same as the thermoelectric device, or other sources. The lighting devices 42 and/or wires 44 can be secured to the second edge 40 by way of an adhesive 46.

Figure 5:
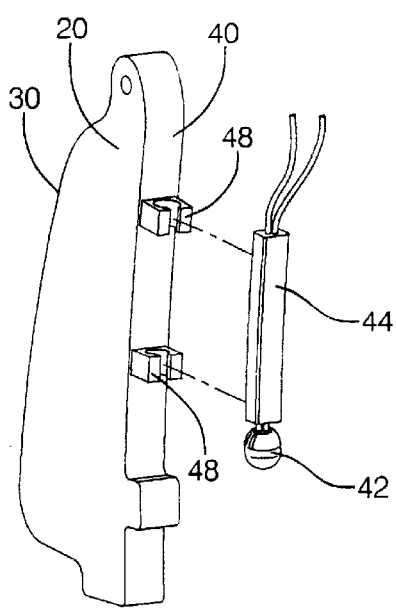
FIG. 5 illustrates an exemplary embodiment of a compensating lever.

Alternately, and as illustrated in FIG. 5, the lever 20 can be mechanically secured on second edge 40. For example, levers 20 can comprise connectors 48 disposed on second edge 40. Connectors 48 are adapted to secure the lighting devices 42 and/or wires 44 to the lever 20. Of course, alternate means for securing lighting devices 42 and/or wires 44 to the lever 20 are contemplated for use with the present disclosure. For example, adhesive 46 and connectors 48 can be used in combination with one another to secure the lighting devices to the levers.

Alternate exemplary embodiments of the cup holder are illustrated in FIGS. 6–9 wherein component parts performing similar or analogous functions are numbered in multiples of one hundred.

Figure 6:
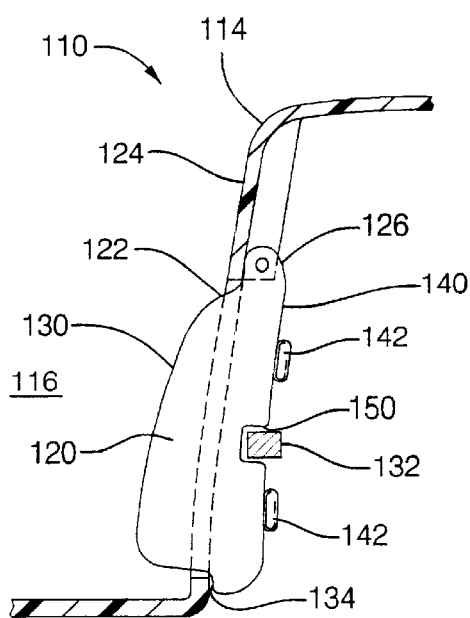
FIGS. 6–9 illustrate alternate exemplary embodiments of the cup holder of FIG. 3.

Referring now to FIG. 6, a first alternate exemplary embodiment of a cup holder 110 is illustrated. The cup holder 110 comprises a generally circular opening 114 defining in a generally cylindrical receiving area 116. One or more compensating levers 120 are disposed in slots 122 defined within the sidewall 124 of the receiving area 116.

The compensating levers 120 comprise a first end 126, a second end 128, a first edge 130, and a second edge 140. The first end 126 is pivotally connected to the sidewall 124 such that the second end 128 of the lever can move with respect to the sidewall. Thus, the compensating lever 120 is pivotally connected to the sidewall 124 such that the first edge 130 is movable between a first position and a second position with respect to the receiving area 116. Again, the compensating lever 120 is biased to the first position by a biasing member 132.

However, this embodiment eliminates the need for a separate biasing member for each lever. Rather, the cup holder 110 comprises a single biasing member 132 that is common for all of the compensating levers 120. For example, the member 132 can be an elastic band of material disposed in a slot 150 defined in the second edge 140 of each of the levers 120. As the bottom edge of the drinking vessel moves down (e.g., from the first end towards the second end) the angled surface 136, the levers 120 expand the biasing member 132 (e.g., the biasing member is placed in tension). In this manner, the cup holder 110 automatically or self adjusts to retain drinking vessels of various dimensions merely through the action of inserting the vessel. Once the vessel is removed from the receiving area 116, the biasing member 132 contracts to return the levers 120 to the first position.

In order to provide the desired illumination of the cup holder 110, the lever 120 includes lighting devices 142 operatively disposed or otherwise secured to the second edge 140. For example, one of the lighting devices 142 can be an LED providing light of a first color and the other of the devices can be an LED providing light of a second color.

Figure 7:
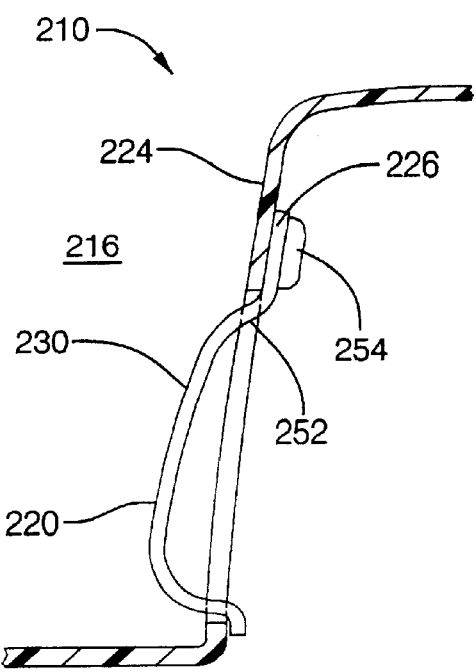
Figure 8:
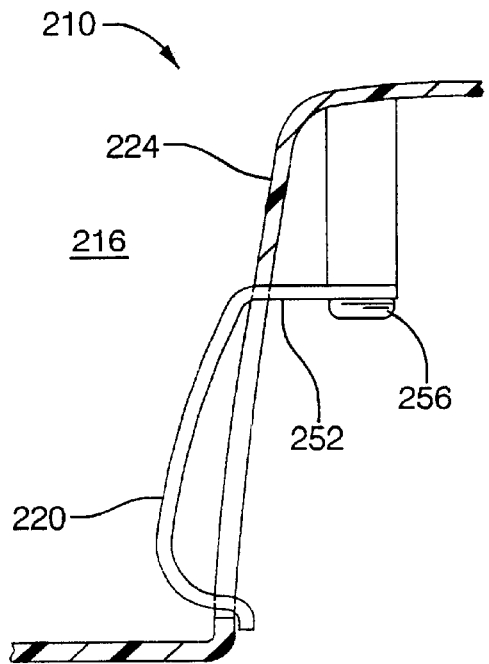
Figure 9:
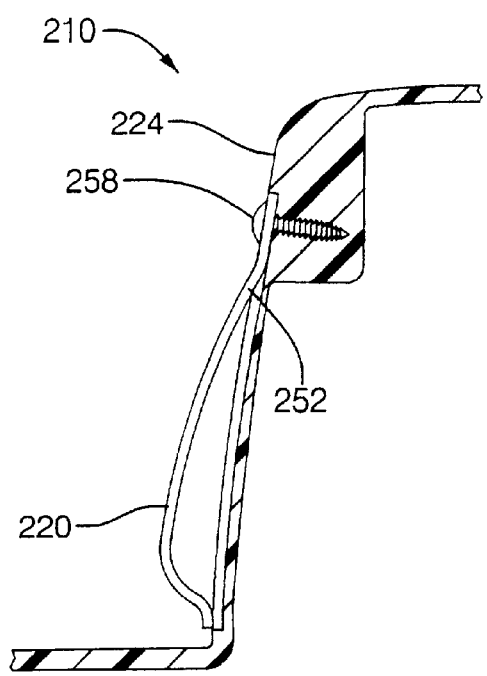

Referring now to FIGS. 7–9, alternate exemplary embodiments of the cup holder 210 are illustrated. The cup holder 210 eliminates the need for a biasing member and a hinge means. Specifically, the compensating levers 220 comprise a biasing section 252 disposed between the first edge 230 and the first end 226. The biasing section 252 is a resilient section of the lever 220. The biasing section 252 has sufficient resiliency to allow the insertion of a drinking vessel to move the levers from first position, and to return the levers to the first position once the vessel has been removed.

The first end 226 of each lever 220 is secured to the sidewall 224 of the receiving area 216. For example, the first end 226 is secured to the sidewall 224 by means of a heat stake 254 (FIG. 7), a rivet 256 (FIG. 8), a screw 258 (FIG. 9), and others. Alternately, the levers 220 can be integrally molded as part of the sidewall 224.

Also illustrated in FIG. 9 is an alternate embodiment of the slot 222. Here, the slot 222 does not pass completely through the sidewall 224. Rather, the slot forms a recess in the sidewall that receives the levers 220 when the levers are moved from the first position.

Figure 10:
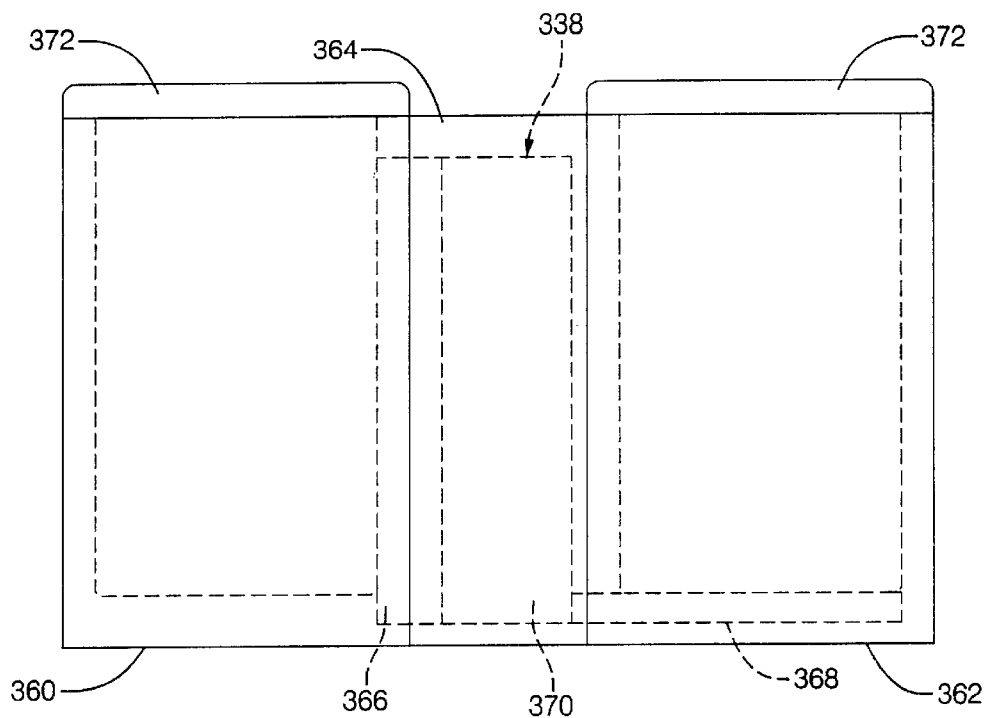
FIGS. 10–11 illustrate an exemplary embodiment of a thermoelectric device for the cup holder.
Figure 11:
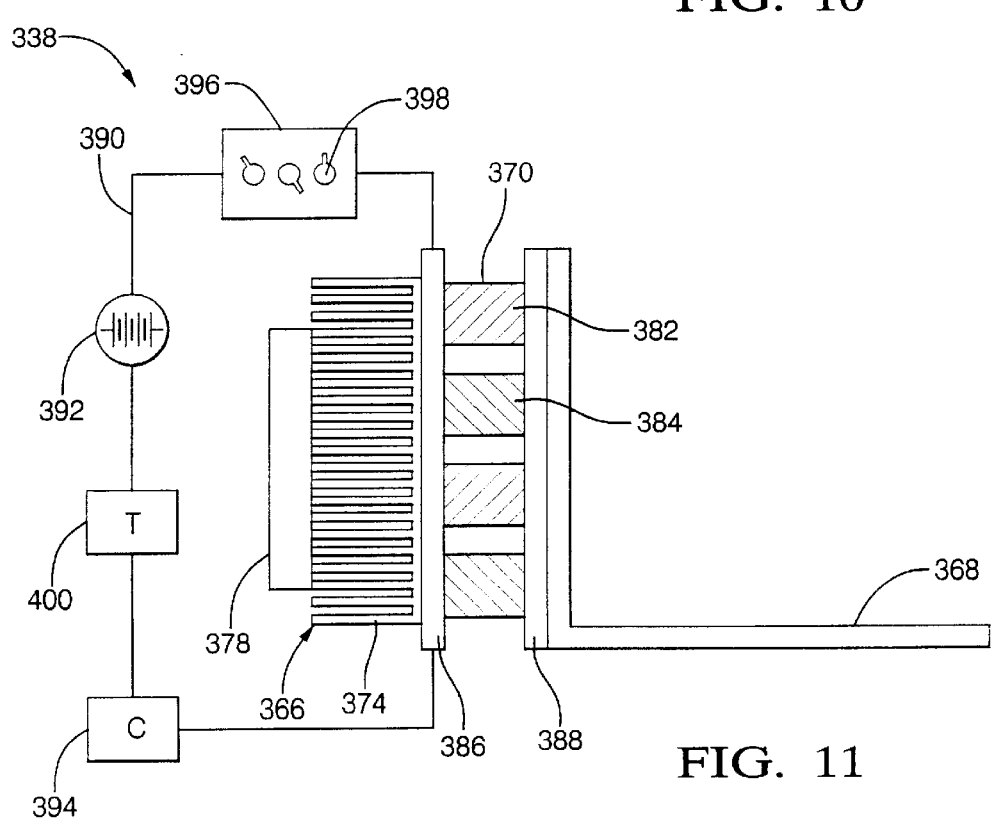

Referring now to FIGS. 10–11, an exemplary embodiment of the thermoelectric device 338 is illustrated. Thermoelectric device 338 is, for example, a Peltier type device, also known as a thermoelectric module. These devices are small solid-state devices that function as heat pumps. A "typical" unit is a few millimeters thick by a few millimeters to a few centimeters square. It is a sandwich formed by two ceramic plates with an array of small Bismuth Telluride cubes ("couples") in between. When a DC current is applied heat is moved from one side of the device to the other forming a "cold" side and a "warm" side.

Illustrated in FIG. 10, the center console 312 includes a first cup holder 360 and a second cup holder 362. For the purpose of clarity, various components of the cup holders are omitted. The cup holders are positioned to be adjacent a common wall 364 and thermoelectric device 338 is disposed in the wall. The thermoelectric device 338 is a dual stage module having a heat sink assembly 366 (e.g., the hot side) and a cold plate 368 (e.g., the cold side). The heat sink assembly 366 is configured to provide heat to the first cup holder 360. The cold plate 368 is configured to remove heat or cool the second cup holder 362. In this manner, the first cup holder 360 is heated by thermoelectric device 338, while the second cup holder 362 is cooled by the thermoelectric device.

Each of the cup holders can include a lid 372 to prevent undesired migration of heat into or out of the cup holders. The lids can be hingeably or otherwise connected to the cup holders.

The thermoelectric device 338 comprises a conductive element 370 illustrated in FIG. 11. The conductive element 370 provides electric connectivity to heat sink assembly 366 and cold plate 368. Conductive element 370 is connected at a first end to heat sink assembly 366 and is connected to cold plate 368 at a second end. The heat sink assembly 336 is disposed in the first cup holder 360, and the cold plate 368 is disposed in the second cup holder 362.

In the illustrated embodiment, the conductive element 370 is disposed between the cup holders. Of course, other locations of the conductive element that allow the thermoelectric device to heat and cool the cup holders are contemplated.

Heat sink assembly 366 includes a heat sink 374 preferably disposed in or adjacent to the first cup holder 360. Heat sink 374 includes a plurality of fins 376 to promote distribution of heat to the first cup holder. A fan mechanism 378 is disposed adjacent to heat sink 374.

Heat sink assembly 366 further includes a cover member 380 disposed about heat sink 374 and fan mechanism 378. Cover member 380 serves to prevent direct contact of the heat sink assembly 366 by drinking vessels within the first cup holder while still allowing for the efficient transfer of heat thereto. In general, heat sink assembly 366 may be any such apparatus suitable for use in distributing heat in a thermoelectric system.

Cold plate 368 is disposed adjacent to the second cup holder 362 and is connected to conductive element 370. Cold plate 368 is a thin element preferably made of a thermally conductive material such as a metal like aluminum. Cold plate 368 may be L-shaped and equal in width to that of the interior of the second cup holder. Thus, cold plate 368 can form a contact surface for items placed in the second cup holder.

Conductive element 370 comprises semi-conducting materials sandwiched between electrodes. The conductive element 370 comprises, for example, bismuth telluride materials having N-type and P-type properties, the materials being disposed connectively with electrical conductors such as copper members which, in turn, are connected to electrically insulative and thermally conductive electrode materials such as ceramics.

More specifically, conductive element 370 is a dual stage thermoelectric element and is composed of a plurality of P-type thermoelectric materials 382 and N-type thermoelectric materials 384, both arranged between a first electrode layer 386 and a second electrode layer 388. Of course, single stage and/or multiple stage thermoelectric elements are contemplated for use with the present disclosure.

In an exemplary embodiment, first electrode layer 386 and second electrode layer 388 are ceramic substrates. The first and second electrode layers are disposed therebetween to hold the overall structure of thermoelectric device 338 together mechanically, and insulate individual P-type 382 and N-type 384 thermoelectric materials electrically from one another and from external mounting surfaces.

An electrical current from a circuit 390 is passed through first electrode layer 386 in a first direction. The arrangement of P-type 382 and N-type 384 thermoelectric material causes first electrode layer 386 to heat up while second electrode layer 388 cools as the electrical current moves back and forth alternately between first and second electrode layers 386,388 and between P-type and N-type thermoelectric materials 382,384. As a result, first electrode layer 386 provides a heating function to heat sink 374 attached thereto and second electrode layer 388 provides a cooling function to cold plate 368 attached thereto.

A DC (direct current) power source 392 generates a low voltage current through circuit 390 causing electrons to move through the P-type and N-type thermoelectric materials. Heat from second electrode layer 388 is pumped to first electrode layer 386 through the electron movement, and heat from first electrode layer 386 is transferred to the first cup holder 360 by heat sink 374. Thus, as objects placed within the second cup holder 362 come into contact with second electrode layer 388 via the cold plate 368, the cooling of layer 388 causes the objects to cool. Correspondingly, objects placed in the first cup holder 360 are heated by heat dissipated from heat sink 374 by fan 378.

More specifically, heat generated by first layer 386 is transferred to heat sink 374 and dissipated through fins 376 to the first cup holder 360. Fan mechanism 378 circulates air within the cup holder, readily exposing the air to fins 376, and thus facilitating distribution of heat to vessels in the first cup holder.

Alternatively, thermoelectric device 338 may operate without a heat sink 374 where the generated heat from the first electrode layer 386 dissipates directly into the surrounding air within the first cup holder, or dissipates into a hot plate in a manner similar to that described above for the cold plate 368.

It should be appreciated that heat sink 374 is capable of dissipating the heat generated upon first electrode layer 386 as well as heat resulting from the electrical circuit 390 and associated power supply operating mechanisms.

It will be understood that, in another embodiment of the present invention, first electrode layer 386 and heat sink 374 constitute a single integrated feature serving to both generate and dissipate heat produced by device 338. Furthermore, second electrode layer 388 and cold plate 368 may also constitute a single integrated feature for providing a cooling function to the second cup holder 362.

It should be appreciated that the cooling/heating process provided by thermoelectric device 338 may be reversed by changing the polarity (plus and minus) of DC power source 392, thereby causing the electrons to move in the opposite direction, resulting in the cooling of first electrode layer 386 and heating of second electrode layer 388.

In the reverse process of heating second electrode layer 388, DC power source 392 generates a low voltage current in circuit 390, causing the electrons to move through N-type 384 and P-Type 382 thermoelectric materials. Due to the electron movement, heat is absorbed by first electrode layer 386 and expelled at second electrode layer 388.

It should also be appreciated that this reverse heating/cooling characteristic of thermoelectric device 338 allows an appropriate closed-loop temperature control circuit, or a thermister, to be utilized to accurately control the temperature within the cup holders to better than +/-1° C. (degree Celsius).

In one embodiment, thermoelectric device 338 operates to maintain a temperature of approximately 0° C. in the second cup holder while simultaneously providing a temperature of approximately 60° C. in the first cup holder. Of course, other temperature variations and ratios may be provided by the thermoelectric device 338.

In a preferred embodiment, the thermoelectric device 338 also includes a controller 394 to facilitate operation of device. Controller 394 regulates power supply 392 of thermoelectric device and includes a thermostat mechanism with which controller 394 monitors and maintains desired temperatures within the cup holders by selectively activating, deactivating, or otherwise adjusting the operation of thermoelectric device 338.

Thermoelectric device 338 further includes an instrument control panel 396, which allows a user to control the operation of the device. Instrument control panel 396 is communicatively connected to controller 394. Instrument control pane 396 includes one or more adjustment mechanisms 398. By selective manipulation of mechanisms 398, the user may turn on, turn off thermoelectric device 338, or otherwise vary the operation thereof thus regulating the temperature within cup holders.

The adjustment mechanisms 398 can be electrically connected to the lighting devices of the first and second cup holders. Adjustment of the first cup holder 360 to heating via the adjustment mechanisms 398 would cause the lighting devices in that cup holder to be illuminated with a red color scheme. Alternately, adjustment of the first cup holder 360 to cooling via the adjustment mechanisms 398 would cause the lighting devices in that cup holder to be illuminated with a blue color scheme. Thus, the cup holders and thermoelectric device 338 can be configured to provide a visual indication as to the mode (e.g., heating or cooling) of the thermoelectric device 338 in the particular cup holder.

Controller 394 can further include a timing mechanism 400, which monitors operation of power source 392 and disables the power source at a predetermined time following disengagement of an engine of a vehicle in which the device is disposed. Thus, power reserves of the vehicle are preserved.

It should be recognized that the thermoelectric device has been illustrated above by way of example only as being incorporated into first and second cup holders, where one of the cup holders is heats and the other one cools the contents of the cup holders. Of course, it is contemplated for thermoelectric device to be configured to provide heat to both cup holders or to cool both cup holders. Additionally, it is also contemplated for the thermoelectric device to be incorporated into a single cup holder, where the cup holder can either heat or cool the contents of the cup holder.

It should also be noted that the terms "first", "second", and "third" and the like may be used herein to modify elements performing similar and/or analogous functions. These modifiers do not imply a spatial sequential or hierarchical order to the modified elements unless specifically stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A self-adjusting cup holder, comprising:
    a receiving area configured to receive a portion of a drinking vessel;
    a plurality of slots defined in a wall of said receiving area;
    one or more compensating levers being disposed in said slots, each of said compensating levers having a first end and a first edge, said first end being pivotally connected to a first portion of said wall such that said first edge is movable between a first position and a second position, said first edge being within said receiving area when in said first position, and said first edge being farther from said wall in said first position than in said second position; and
    means for biasing said compensating levers to said first position.

2. The self-adjusting cup holder as in claim 1, wherein said first edge comprises an angled surface, said angled surface being configured to contact a bottom edge of said drinking vessel such that placement of said drinking vessel in said receiving area overcomes said biasing means and moves said compensating levers from said first position towards said second position.

3. The self-adjusting cup holder as in claim 2, wherein said compensating levers each comprise a second edge, opposite said first edge.

4. The self-adjusting cup holder as in claim 3, wherein said biasing means comprises a resilient member disposed at said second edge of each of said compensating levers, said resilient member being compressed by movement of said compensating levers from said first position.

5. The self-adjusting cup holder as in claim 4, wherein each of said compensating levers further comprises a section having a dimension that is larger than a dimension of said slot, said section abutting an exterior side of said wall when said compensating levers are in said first position and said section being remote from said exterior side when said compensating levers are in said second position.

6. The self-adjusting cup holder as in claim 3, wherein said biasing means comprises a single biasing member that is common for all of said compensating levers, said single biasing member being disposed at said second edge of each of said compensating levers and being placed in tension by movement of said compensating levers from said first position.

7. The self-adjusting cup holder as in claim 3, wherein at least one of said compensating levers is configured to transmit at least a portion of light from a lighting device disposed at said second edge into said receiving area.

8. The self-adjusting cup holder as in claim 7, wherein said lighting device is selected from the group consisting of an incandescent light source, a light emitting diode, and a fiber optic cable.

9. The self-adjusting cup holder as in claim 7, further comprising a thermoelectric device for heating and/or cooling contents of said drinking vessel.

10. The self-adjusting cup holder as in claim 9, wherein said lighting device provides a first color when said thermoelectric device is heating and a second color when said thermoelectric device is cooling.

11. The self-adjusting cup holder as in claim 9, wherein light from said lighting device is colored to a selected color.

12. The self-adjusting cup holder as in claim 7, wherein said lighting device is secured to said second edge by a means selected from the group consisting of an adhesive, mechanical connectors disposed on said second edge, and combinations of the foregoing.

13. The self-adjusting cup holder as in claim 1, wherein said first end is connected to said wall by a hinge.

14. The self-adjusting cup holder as in claim 13, wherein said hinge comprises integral features formed on said compensating lever and formed on said portion of said wall, said integral features being configured to receive one another in a snap fit manner.

15. The self-adjusting cup holder as in claim 1, wherein said receiving area includes a handle depression configured to receive a handle of a beverage mug therein.

16. The self-adjusting cup holder as in claim 1, wherein said one or more compensating levers comprises three compensating levers evenly spaced about a circumference of said receiving area.

17. The self-adjusting cup holder as in claim 1, wherein each of said compensating levers comprises a biasing section, said biasing section being configured to provide said biasing means and to allow said first edge of said compensating levers to move between said first and second positions.

18. The self-adjusting cup holder as in claim 17, wherein said first end of each of said compensating levers is secured to said portion of said wall by a heat stake, a rivet, a screw, or is integrally molded as part of said sidewall.

19. The self-adjusting cup holder as in claim 18, wherein said slot does not pass completely through said wall.

20. A self-adjusting drinking vessel holder for retaining a drinking vessel in a vehicle having a vehicle interior and a dashboard, the self-adjusting drinking vessel holder comprising:

a receiving area adapted to be secured to the vehicle interior, said receiving area being configured to receive a portion of the drinking vessel;

a plurality of slots defined in a wall of said receiving area;

a compensating lever being disposed in each of said plurality of slots, each said compensating lever having a first end and a first edge, said first end being pivotally connected to said wall such that said first edge is movable between a first position and a second position, said first edge being within said receiving area when in said first position, and said first edge being farther from said wall in said first position than in said second position; and a biasing member for biasing said compensating levers to said first position.

21. A self-adjusting drinking vessel holder as in claim 20, Wherein said compensating levers are illuminated by a light source, said light source provides an illumination that matches an illumination of the dashboard.

22. A self-adjusting drinking vessel holder for retaining a drinking vessel, comprising:

a receiving area configured to receive a portion of the drinking vessel;

a plurality of slots defined in a wall of said receiving area;

a compensating lever being disposed in each of said slots, each said compensating lever having a first end and a first edge, said first end being pivotally connected to said wall such that said first edge is movable between a first position and a second position, said first edge being within said receiving area when in said first position, and said first edge being farther from said wall in said first position than in said second position; and a biasing member for biasing said compensating levers towards said first position.

23. A self-adjusting drinking vessel holder as in claim 22, further comprising:

another receiving area configured to receive a portion of the drinking vessel;

a plurality of slots defined in a wall of said another receiving area;

a compensating lever being disposed in each of said slots in said wall of said another receiving area, each said compensating lever having a first end and a first edge, said first end being pivotally connected to said wall such that said first edge is movable between a first position and a second position, said first edge being within said receiving area when in said first position, and said first edge being farther from said wall in said first position than in said second position; and a biasing member for biasing said compensating levers toward said first position.

24. A self-adjusting drinking vessel holder as in claim 23, further comprising:

a thermoelectric device for heating said receiving area and cooling said another receiving area.

25. A self-adjusting drinking vessel holder as in claim 24, wherein said compensating levers are translucent and each of said compensating levers are illuminated by a light source wherein said light source provides a first color to said receiving area and a second color to said another receiving area.

26. A method of retaining a drinking vessel in a self-adjusting drinking vessel holder, comprising:

inserting a portion of the drinking vessel into a receiving area defined by at least one wall; and providing a retaining force to the drinking vessel when said portion is inserted into said receiving area, said retaining force being provided by a plurality of compensating levers pivotally secured to said at least one wall wherein each compensating lever is biased into said receiving area by a biasing member and each compensating lever passes through an opening in said at least one wall wherein the presence of said portion of the drinking vessel in said receiving area causes a portion of said compensating levers to move in said opening.

* * * * *